United States Patent [19]
Moore, Jr.

[11] 3,738,421
[45] June 12, 1973

[54] HEATRONIC CAPACITOR

[76] Inventor: Robert David Moore, Jr., 817 W. Camino Real, Arcadia, Calif. 91006

[22] Filed: June 11, 1971

[21] Appl. No.: 152,185

[52] U.S. Cl. .................. 165/32, 165/1, 165/105, 165/186
[51] Int. Cl. ......................................... G05d 23/00
[58] Field of Search ............... 165/1, 32, 105, 186

[56] References Cited
UNITED STATES PATENTS

| | | | |
|---|---|---|---|
| 3,004,394 | 10/1961 | Fulton, Jr. et al. ............. | 165/32 X |
| 3,406,244 | 10/1968 | Oktay .............................. | 165/105 X |
| 3,563,309 | 2/1971 | Basiulis ........................... | 165/105 |
| 3,613,774 | 10/1971 | Bliss, Jr. .......................... | 165/105 X |

*Primary Examiner*—Albert W. Davis, Jr.
*Attorney*—Christie, Parker & Hale

[57] ABSTRACT

A thermal analog of an electronic capacitor has a pair of substantially similar characters in vapor communication. Each chamber has a capillary material less than completely filled with a capacitance liquid. The liquid comprises a vaporizable heat transfer material and a substantially non-vaporizable solute with a relative broad solubility range. Vaporization of the heat transfer material from one chamber and condensation in the other serves to "charge" or "discharge" the heatronic capacitor. The vapor pressure differences due to differences in concentration in the heat transfer liquid permit the capacitor to hold a selected heat "charge" approximately proportional to the temperature differential across it, analogous to operation of an electronic capacitor.

10 Claims, 3 Drawing Figures

PATENTED JUN 12 1973

3,738,421

INVENTOR.
ROBERT DAVID MOORE, JR.
BY
Christie, Parker & Hale
ATTORNEYS

HEATRONIC CAPACITOR

BACKGROUND

This application is closely related to my copending patent application Ser. No. 152,093 entitled "Heatronic Valves" and claims subject matter disclosed therein. In the copending application thermal analogs of electronic transistors are provided. In order to form a broad variety of heatronic circuits analagous to electronic circuits, resistors and capacitors are needed in addition to the heatronic "transistors." Resistors are simply thermal resistances inherent in materials. While some "stray" capacitance is present to "ground" due to heat capacity of materials used in constructing a heatronic circuit, such "thermal mass" cannot form a two terminal capacitance as is usually needed in circuit design and therefore a true thermal analog of an electronic capacitor is needed.

BRIEF SUMMARY OF THE INVENTION

Therefore, in practice of this invention according to a preferred embodiment there is provided a closed chamber having two separate bodies of capacitance liquid having a first component having an appreciable vapor pressure and a second component having a much lower vapor pressure, and wherein the vapor of the first component is free to flow between the two bodies of capacitance liquid.

DRAWINGS

These and other features and advantages of this invention will be appreciated as the same becomes better understood by reference to the following detailed description of a presently preferred embodiment when considered in connection with the accompanying drawings wherein.

DESCRIPTION

Figure 1:
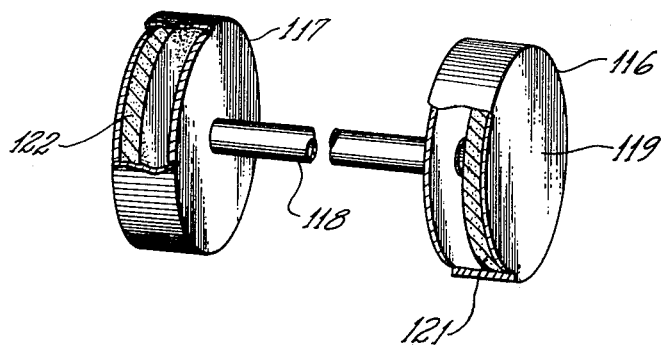
FIG. 1 illustrates in partial cutaway a heatronic capacitor constructed according to principles of this invention.

FIG. 1 illustrates schematically a heatronic capacitor for providing capacitance in substantially the same manner capacitance is provided in an electronic circuit. The heatronic capacitor comprises a closed chamber, a portion of the envelope of which is cut away in FIG. 1 in order to reveal the internal structure. A capacitance fluid composed of a heat transfer material and a second material which, together with the heat transfer material, forms a homogenous liquid, but which is not appreciably vaporized at the temperatures involved is distributed within the envelope as subsequently described. The capacitance chamber is symmetrical having two disk-like chambers 116 and 177 thermally isolated from each other but interconnected by a tube 118. Thermal insulation (not shown) may be placed between and around the disks and tube to further reduce heat leakage. A face 119 of the chamber 116 is adapted to receive or discharge heat during operation of the capacitor. A similar face (hidden in FIG. 1) is provided on the other chamber 117 for receiving or discharging heat. The tube 118 is typically only a very short element, no greater than the radius of the disk-like chambers 116 and 117. However, the length of the tube 118 may be extended to form a conductor of considerable length without appreciably affecting the performance of the device as long as it is kept sufficiently hot that liquid does not condense within it. It will also be apparent that the chambers 116 and 117 need not be circular. They can have other geometries as may be convenient in a particular application.

Within the chamber 116 and in thermal contact with the face 119 adapted to receive or discharge heat is a capillary material 121 which is preferably multiply vented with channels or large pores (not shown) that are sufficiently larger than the majority of pores that they distribute vapor throughout the capillary material so that the vapor and liquid are in intimate contact throughout the capillary material. The amount of fluid contained in the chambers is limited so that the channels or larger pores are never completely liquid filled. The quantity of capillary material 121 that is provided in the chamber 116 is selected to provide a fine capillary pore volume appropriate for the desired thermal capacitance. The larger the pore volume available to hold liquid the larger the capacitance of the heatronic capacitor.

Within the other chamber 117 is another body of capillary material 122 substantially identical to the body of capillary material 121 in the first chamber. The quantity of capillary pore space in the two chambers is typically identical. The series thermal resistance of the capacitor is largely the thermal resistance of the capillary materials 121 and 122 through which heat must pass. Therefore to decrease the resistance of the heatronic capacitor it is preferred to enlarge the area across the faces through which heat is transferred and make the thickness of the bodies of capillary material as small as feasible. For large capacitors various techniques of pleating, folding, rolling, or the like may be used to reduce the size and thermal mass of the structure. Also, it is desirable to make the capillary material as good a heat conductor as feasible. Thus copper or another high heat conductivity metal or some high heat conductivity ceramic such as beryllium oxide might be used.

An electronic capacitor in effect always has the same net charge (usually approximately zero) within it and it is only the charge distribution between the two sides of the capacitor that varies with time. A similar function is provided in the heatronic capacitor wherein the quantity of heat contained within the heatronic capacitor is approximately constant and only its distribution from one side thereof to the other is varied with time. In other words, when a capacitor is "charged" the charge flows through the capacitor. Also, when an electronic capacitor is charged the voltage increases proportionately to the total charge passing through the capacitor. To achieve the analogous effect in the heatronic capacitor, each of the bodies 121 and 122 of capillary material in the heatronic capacitor are equally partially filled with a quantity of capacitance fluid in an amount less than required to fill all of the pore volume of the respective capillary body. The capacitance fluid is not a pure liquid but is instead in the form of a vaporizable heat transfer material containing a substantially non-vaporizable solute with a relatively broad solubility range. A broad variety of materials are suitable for forming the capacitance fluid and, as just one example, a solution of lithium bromide in water may be used.

The vapor pressure of a solution comprising a vaporizable material and a substantially non-vaporizable solute is approximately proportional to the concentration of vaporizable material in the solution. This is in accordance with Raoult's Law. Similarly, the temperature difference between two solutions having different concentrations of vaporizable material, that is necessary to maintain equal vapor pressures over both solutions, is approximately proportional to the difference in the vaporizable material concentration, with the solution having the higher vaporizable material concentration having the lower temperature.

Since the two chambers 116 and 117 are connected, the vapor pressure is the same in both, and since each of the bodies receives an equal charge of a capacitance liquid, both contain the same amount of solute. The amount of vaporizable material in each chamber varies, however, as the temperature differential between them varies, or equivalently the temperature differential varies as the vaporizable material evaporates from one chamber and condenses in the other. As one example, assume that heat enters the chamber 117 of the thermal capacitor and evaporates heat transfer material therefrom. The resulting vapor passes through the tube 118, carrying with it the heat of vaporization which is delivered to the capillary material 121 of the chamber 116 from which it flows through the chamber wall out of the capacitor. Thus, heat passing through the capacitor transfers vaporizable heat transfer material from chamber 117 to chamber 116, thus decreasing the concentration of the vaporizable heat transfer material in chamber 117 and increasing the concentration in the other chamber 116.

To accomplish this transfer, or maintain it once established, requires that the chamber 117 be hotter than the chamber 116 by the temperature differential mentioned above, which is approximately proportional to the difference in concentration of the vaporizable heat transfer material in the two chambers. The temperature differential is thus approximately proportional to the amount of heat transfer material transferred between the chambers and thus to the amount of heat transferred. The thermal capacitor is thus a good analog of an electrical capacitor with the usually unimportant difference that it is difficult to make the thermal capacitor as linear as a typical electrical capacitor. This lack of linearity, however, does not prevent thermal capacitors from being used in most typical applications, such as, filtering capacitors or blocking capacitors.

The overall thermal capacitance $C_o$ of the heatronic capacitor is exactly equal to $\Delta Q/\Delta T$, where $\Delta Q$ is the total heat transferred across the capacitor, and $\Delta T$ is the temperature differential. An approximate derivation utilizing Raoult's Law and the Clapeyron-Clausius Equation gives $$C_o = \frac{\Delta Q}{\Delta T} = \frac{NL_e^2 \left[1 + \frac{1}{X}\left(1 - \left(\frac{\Delta N}{N}\right)^2\right)\right]}{2RT^2} \quad (1)$$

which is approximately equal to $$\frac{NL_e^2\left(1+\frac{1}{X}\right)}{2RT^2} \quad (2)$$

when $\Delta N/N$ is very much less than 1; where N is the number of gram moles of vaporizable heat transfer material originally in one chamber of the capacitor; $\Delta N$ is the decrease in heat transfer material in the chamber initially receiving the heat; $L_e$ is the heat of vaporization of one gram mole of heat transfer material; R is the gas constant; T is the mean of the absolute temperatures of the two sides of the capacitor; and X is the total mole fraction of solute (molecules or ions) initially in the capacitance solution; likewise, the temperature differential $\Delta T$ across the thermal capacitance is $$\Delta T = \frac{2RT^2\left(\frac{\Delta N}{N}\right)}{L_e\left[1+\frac{1}{X}\left(1-\left(\frac{\Delta N}{N}\right)^2\right)\right]} \quad (3)$$

and the heat transferred $\Delta Q$ is $$\Delta Q = L_e \Delta N = L_e(\Delta N/N)N \quad (4)$$

It is generally not good practice to evaporate all of the heat transfer material from either chamber since the capacitor becomes quite nonlinear as the $\Delta N/N$ term approaches 1, and also if the solute is a solid, the solute will crystallize out of the solution and have to be redissolved in order to "discharge" the capacitor. Usually this would be accompanied with considerable hysteresis which appears as a large series resistance. In a typical embodiment, about one-half of the heat transfer material is evaporated from one chamber to the other at the maximum state of charge. Thus, a capacitor which initially has two parts of vaporizable heat transfer material in each chamber when uncharged would have one part of heat transfer material in one chamber and three parts of heat transfer material in the other chamber when at maximum design charge. In order to obtain greater linearity, that is, wherein $\Delta T$ is more closely proportional to $\Delta Q$, the capacitor may be designed to transfer a smaller proportion of the heat transfer material between the chambers.

The design parameters for a selected capacitor are obtained by first setting $\Delta N/N$ either to about one-half or less if necessary to achieve greater linearity, then solving Equation (3) for X, and inserting the temperature difference $\Delta T$ as required. The Mol fraction of solute, X, versus temperature differential, $\Delta T$, may be obtained more accurately directly from data relating vapor pressure to concentration and temperature for the solution of vaporizable heat transfer material and solute. In any case, the solubility limits of the solute should not be exceeded so that the liquid in the capillary bodies remains as a single phase. The number of gram moles of heat transfer material required is obtained by solving Equation (4) for N, having inserted the desired maximum value of heat $\Delta Q$ transferred to charge the capacitor ($\Delta Q = C_o \Delta T$).

The porous material 122 is the capacitor is vented with vapor passages (not shown) both to increase the heat transfer capability of the surface and, of more importance, to insure that evaporation or condensation of the heat transfer material takes place uniformly throughout the porous material so as to avoid appreciable differences in solute concentration within the body. Such concentration differences result in long diffusion time constants and hysteresis, which appears as a series resistance in the capacitor. Venting in this case where the vapor flow rates are relatively low may be achieved by utilizing a porous material having an appreciable range of pore sizes and sufficient pore volume for a portion of the pores to remain vapor filled under all normal operating conditions. If desired, a vented capillary surface structure as described in my copending Patent application Ser. No. 152,093 may be employed.

A solute may comprise a single or several different substances which may be liquid or solid at the operating temperatures and which have a very low vapor pressure at the operating temperature. The vaporizable heat transfer material may also comprise one or more substances. The only distinction between the heat transfer material and the solute as used herein, being that the heat transfer material has a considerably higher vapor pressure than the solute at the operating temperatures. In some circumstances, the vaporizable heat transfer material might by itself be a solid, which in mixture with the solute forms a liquid solution.

Although a solution of lithium bromide in water is well suited for a capacitance liquid, many other combinations of vaporizable heat transfer material and solute will be apparent to one skilled in the art.

The heat capacity or thermal mass of a material actually acts as a type of thermal capacitance for which the electrical analog is a capacitor with one lead permanently grounded. Even though such capacitances are useful in some filtering applications, thermal masses are not suitable as true two terminal capacitors, such as a blocking capacitor between two stages of an amplifier, where it is necessary to let alternating signals pass while blocking direct potentials (thermal potentials or temperature differences in this case). Most typical heat conductors and heat transfer devices, including heatronic valves and thermal capacitors, have appreciable thermal masses analogous to stray capacitances to ground, which should be explicitly considered in heatronic designs. The usual result of the stray capacitances is an increase in various time constants. Generally, it is best to keep the thermal mass of the various system elements to a minimum, the thermal resistances low, and the heat flow rates high to reduce these time constants as much as possible.

Figure 2:
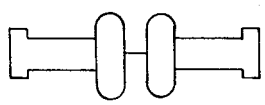
FIG. 2 illustrates a symbolic nomenclature for the heatronic capacitor.
Figure 3:
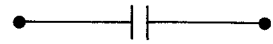
FIG. 3 illustrates the symbol for an electronic capacitor for comparison.

FIG. 2 illustrates a symbolic nomenclature for a heatronic capacitor as described and illustrated in FIG. 1. The analogy of this to the symbol for an electronic capacitor as illustrated in FIG. 3 is apparent. The ovals interconnected by a single line represent the separate bodies of capacitance liquid in vapor communication. The parallel lines at either side represent heat transfer leads. The "boxes" at the ends of the lines are terminals and are omitted when the heatronic capacitor is connected to other circuit elements.

Although but one embodiment of heatronic capacitor constructed according to principles of this invention has been described and illustrated herein, many modifications and variations will be apparent to one skilled in the art. Thus, the specific geometry illustrated is generally preferred for mating with other heatronic circuit elements, however, many other symmetrical and non-symmetrical arrangements can be used. Likewise, the mention of an example of capacitance liquid should not be deemed exclusive since an enormous variety of solutions with broad solubility ranges will be apparent to one skilled in the art. Many other modifications and variations will be apparent and it is therefore to be understood that within the scope of the appended claims the invention may be practiced otherwise than as specifically described.

What is claimed is:

1. A thermal analog of an electrical capacitor comprising:
   a closed chamber;
   two separate bodies of capacitance liquid in the chamber, said capacitance liquid comprising a solution of:
   a first component having an appreciable vapor pressure at operating temperature; and
   a second component having a much lower vapor pressure at operating temperature; and wherein the vapor of the first component is free to flow between said two bodies of capacitance liquid; and
   means for keeping the bodies of capacitance liquid separate.

2. A thermal analog of an electrical capacitor as defined in claim 1 wherein the means for keeping the bodies of capacitance liquid separate comprises separate bodies of porous material.

3. A thermal analog of an electrical capacitor as defined in claim 2 wherein the porous material is a good heat conductor.

4. A thermal analog of an electrical capacitor as defined in claim 2 wherein, under operating conditions, the bodies of porous material have sufficient pore volume to contain the capacitance liquid and leave a portion of the pores vapor filled so that vapor may flow into the porous material.

5. A thermal analog of an electrical capacitor as defined in claim 2 and further comprising passages in the porous material; and wherein, under operating conditions, the bodies of porous material have sufficient pore volume to contain a sufficient quantity of capacitance liquid as to leave passages vapor filled.

6. A thermal analog of an electrical capacitor as defined in claim 1 wherein said means for keeping the bodies of capacitance liquid separate comprises means for dividing the chamber into two chambers interconnected by a conduit with a body of capacitance liquid in each chamber.

7. A heatronic capacitor comprising:
   a closed chamber;
   a first capillary body in the chamber;
   a first surface adjacent the first capillary body for receiving and discharging heat;
   a second capillary body in the chamber separated from the first capillary body;
   a second surface adjacent the second capillary body for discharging and receiving heat;
   means for providing vapor communication between the first and second bodies; and
   a capacitance liquid in each capillary body comprising a vaporizable solvent and a solute having a sufficiently low vapor pressure to be substantially non-vaporizable.

8. A heatronic capacitor as defined in claim 7 wherein, under operating conditions, the capillary bodies each have sufficient capillary volume to contain the capacitance liquid and leave a portion of the capillary volume vapor filled so that vapor may flow therethrough.

9. A heatronic capacitor as defined in claim 7 and further comprising passages in the capillary material;

and wherein, under operating conditions, the capillary bodies each have sufficient capillary volume to contain a sufficient quantity of capacitance liquid to leave the passages vapor filled.

10. A heatronic capacitor as defined in claim 7 wherein said chamber comprises two chambers interconnected by a conduit with a capillary body being in each chamber.

* * * * *